Dec. 30, 1941.  M. L. ASH, JR  2,268,436
APPARATUS FOR TESTING AND TIMING PHOTOGRAPHIC EXPOSURES
Filed Aug. 17, 1938  2 Sheets-Sheet 1
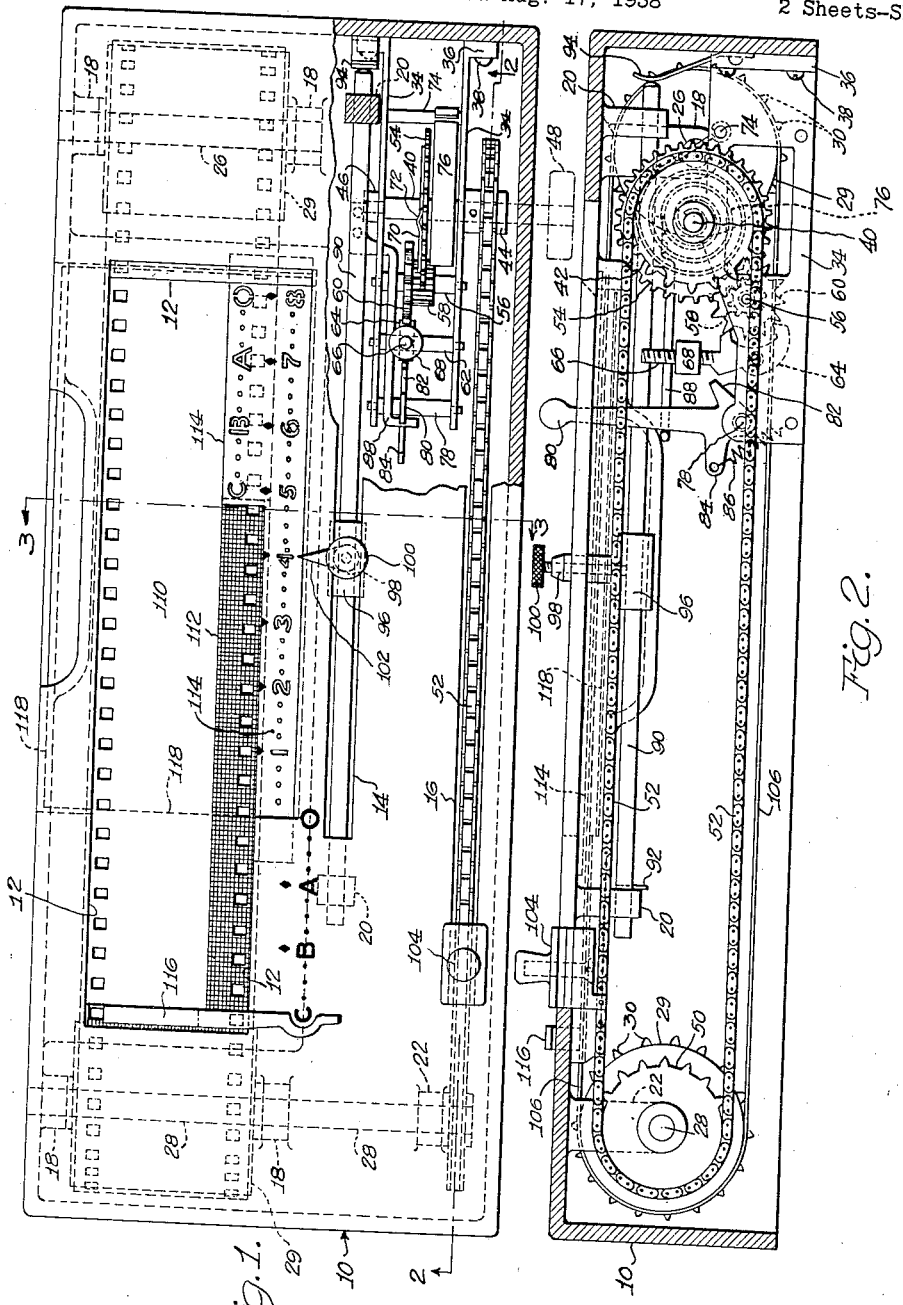
Inventor
Maurice L. Ash Jr,
By
Attorneys Dec. 30, 1941.                 M. L. ASH, JR                    2,268,436
              APPARATUS FOR TESTING AND TIMING PHOTOGRAPHIC EXPOSURES
                              Filed Aug. 17, 1938              2 Sheets-Sheet 2
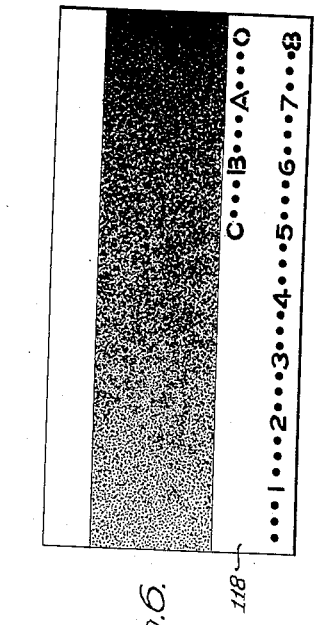
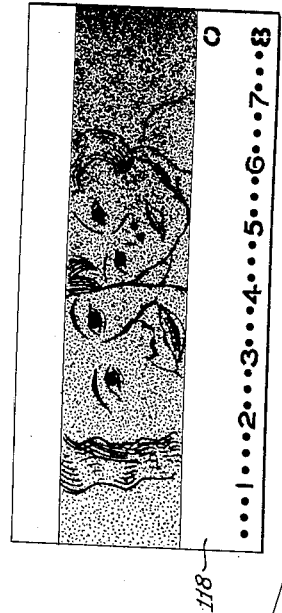
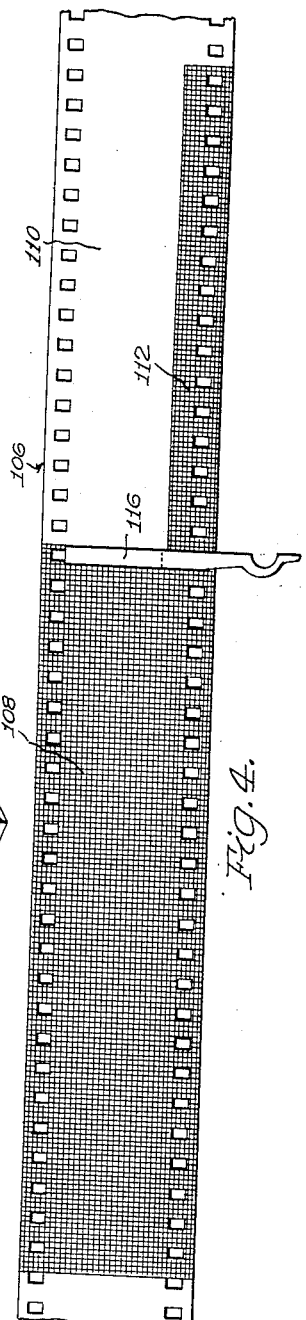
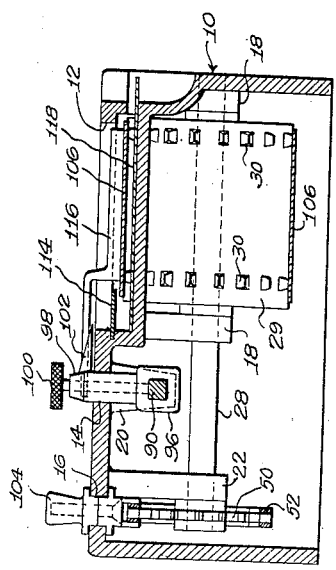
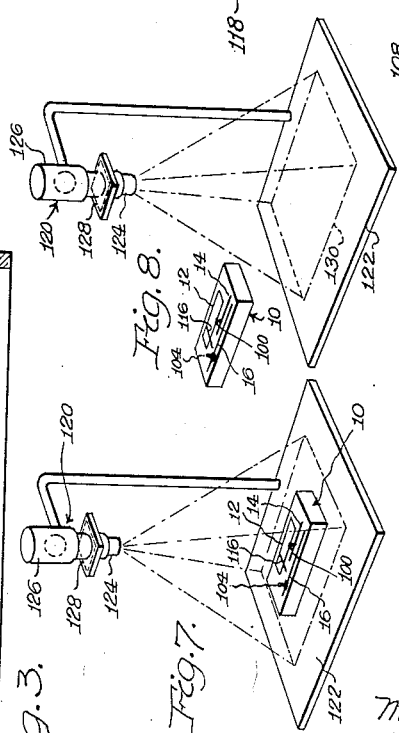
Inventor
Maurice L. Ash, Jr,
By
Attorneys Patented Dec. 30, 1941

2,268,436

UNITED STATES PATENT OFFICE 2,268,436

APPARATUS FOR TESTING AND TIMING PHOTOGRAPHIC EXPOSURES

Maurice L. Ash, Jr., Detroit, Mich.

Application August 17, 1938, Serial No. 225,388

1 Claim. (Cl. 95—10)

This invention relates, in general, to photographic reproductions and, in particular, to an improved method of and apparatus for determining the proper duration of time required for obtaining properly clear and detailed exposures and employing this determination for controlling the attainment of the reproductions.

The main object of this invention is to provide an improved method of and apparatus for determining the duration of time of exposure necessary for the properly detailed reproduction of images from negatives, and to time the process of said reproduction in accordance therewith.

Another object of the invention is to provide the period of time during which printing paper will become exposed to the desired extent, by moving a shutter and a test strip of said paper relatively to each other in the path of light which is passing through the negative, and obtaining on said strip an infinite number of infinitesimal stages of exposure, each stage representing an exposure of different duration from those of adjacent stages, choosing the desired stage, and using the time therefor as a standard for the length of exposure of said printing paper in the path of said light.

Another object is to provide an improved method of and apparatus for determining the length of time necessary for detailed reproductions of images from film negatives and for employing this same length of time as a standard of time for the exposure of printing paper, by progressively covering a test strip of said printing paper in the path of projected light with a shutter to expose said test strip between points of too little and too great exposures, selecting a point on said exposed test strip at which proper exposure appears, and then exposing said printing paper in the path of said light for the same length of time that said selected point on said test strip was exposed.

Another object of the invention is to provide an improved testing and timing apparatus for use in photographic reproductions which permit a test strip of printing paper to be moved relatively with respect to a shutter in the path of projected light which is passing through a negative bearing the images to be reproduced, the test strip becoming thereby exposed between points of relative exposure and permitting the selection therefrom of a position of properly detailed exposure lying therebetween, said apparatus being provided with means for recording the time required for the selected exposure so that said time can be used as a standard for the proper exposure of said printing paper.

Still another object of the invention is to provide an improved testing and timing device employed in the art of making reproductions of images from film negatives which records on a test strip of printing paper the position of the best available exposure and which permits the use of this record for establishing the time for exposure of said printing paper.

Other objects and advantages of the invention will become readily apparent from a reference to the following specification taken in conjunction with the accompanying drawings of which there are two (2) sheets and wherein:

Figure 1 is a plan view of the novel testing and timing apparatus employed in the novel method, same being shown partly in section and partly broken away to show details of the construction thereof;

Fig. 2 is a part elevational and part sectional view taken along the lines 2—2 in Fig. 1;

Fig. 3 is a sectional view taken along the lines 3—3 in Fig. 1;

Fig. 4 is an enlarged plan view of the combination opaque-translucent shutter employed in the novel method;

Fig. 5 is a plan view of an exposed test strip showing the normal range of exposures and with the subjects of enlargement variably exposed thereon;

Fig. 6 is a plan view of an exposed test strip showing the upper range of exposures;

Fig. 7 is a perspective view, shown diagrammatically, of the enlarging apparatus with the testing and timing apparatus in place with respect thereto; and Fig. 8 is a view similar to Fig. 7 but showing the stage of the enlarging process subsequent to the determination of the desired time of exposure.

In the figures there is shown a hollow, box-like casing, generally indicated at 10, in which is housed and supported the apparatus for accurately determining and controlling the correct periods of time necessary for clear and detailed exposures in photographic reproductions. The top wall of casing 10 is provided with an L-shaped opening 12 running longitudinally thereof and with a pair of longitudinal slots 14 and 16, slots 14 and 16 being spaced from each other and parallel to opening 12. Formed on the underside of the top of the casing 10, adjacent each end and on either side of opening 12, is a boss 18 internally bored to provide a bearing thereat having a transverse axis. Also on the underside of the top of casing 10, adjacent each end of slot 14 and in alignment therewith, there is formed a boss 20 internally bored to provide a bearing thereat having a longitudinal axis. In axial alignment with two of the end bearings 18 there is provided a bearing having a transverse axis formed in an internally bored boss 22 which extends from and is supported by the underside of the top of casing 10 adjacent one end of the slot 16.

Journaled in one group of axially aligned bearings 18 adjacent one end of opening 12 is a transverse shaft 26, while journaled in the other group of axially aligned bearings 18 adjacent the opposite end of opening 12 is another transverse shaft 28, shaft 28 being also journaled in bearing 22 adjacent one end of slot 16. Keyed to each of the shafts 26 and 28 between the respective set of bearings 18 for each thereof is a toothed drum 29, each of said drums being provided at its periphery with two sets of axially and circumferentially spaced teeth 30, the axes of drums 29 being parallel and in substantially the same horizontal plane. The number of teeth 30 on each drum 29, their pitch and their spacing, are factors which are readily determined, as will appear subsequently.

At or near the end of slot 16 which is remote from the bearing 22, between slots 14 and 16, there is provided a spring arbor comprising a pair of horizontally spaced vertical plates 34 (see Figs. 1 and 2) which extend for a substantial distance in longitudinal parallelism within and with respect to casing 10. Plates 34 are secured in any suitable manner to the casing 10 for being supported thereby, such as by being formed with end flanges 36 extending laterally and being secured thereat to an end wall of said casing by means of bolts, screws or rivets 38.

Plates 34 are provided with a pair of aligned openings in which is journaled a transverse shaft 40, said openings being so positioned as to permit shafts 28 and 40 to be substantially parallel and occupy substantially the same horizontal plane. Intermediate the ends of shaft 40 there is mounted for rotation therewith a sprocket wheel 42 (see Fig. 2) having a hub 44 (see Fig. 1) adapted for securing said wheel to said shaft, hub 44 and a nut 46 on one end of shaft 40 serving to prevent shaft 40 from accidental axial movement. The opposite end of shaft 40 is optionally provided with a hand nut 48, or other means, for enabling the ready manual turning of shaft 40. Wheel 42 is disposed immediately between one of the plates 34 and one of the longitudinal walls of the casing 10 and is in longitudinal and circumferential alignment with another sprocket wheel 50 (see Figs. 2 and 3) mounted on the shaft 28 adjacent the bearing 22, wheels 42 and 50 being positioned for occupying the same vertical plane and having the same pitch, said wheels being in driving and driven communication with each other, respectively, by means of an endless chain 52.

Between the plates 34 of the spring arbor, on shaft 40, there is freely mounted a relatively large driving gear 54. In mesh with gear 54, fixedly on a shaft 56 which is supported between the plates 34 and journaled therein in spaced relation to shaft 40, is a relatively small driven gear 58. Laterally of gear 58 on shaft 56, and fixed for rotation with shaft 56 and gear 58, is another of the gears 60 of the escapement mechanism at present being described. In parallelism with shafts 40 and 56, and supported between the plates 34 and journaled therein, is another shaft 62 to and about which is pivoted the ordinary pawl 64 of said escapement mechanism. The lower end of pawl 64, as usual, is bifurcated, its bifurcations being disposed between non-successive spaced teeth on the gear 60 on shaft 56, one of said bifurcations, as shown in Fig. 2, being in engagement with the leading face of one of said teeth on gear 60 and the other of said bifurcations being, as usual, slightly out of engagement with the following face of the third tooth on gear 60 ahead of said other tooth thereon. The upper end of pawl 64 is splined, as at 66, for receiving an adjustable nut 68 thereon, nut 68 being adapted for decreasing or increasing the distance between it and the pivot 62 of pawl 64, an increase thereof lengthening the time for each oscillation of pawl 64 and a decrease thereof naturally shortening said time.

Fixedly mounted on the shaft 40 immediately adjacent the driving gear 54 is an annular ratchet 70 having a plurality of spaced, axially directed detents 72 (see Fig. 1) which are engageable with slotted openings (not shown) in the adjacent face of the gear 54. During movement of the shaft 40 and rachet 70 in counter-clockwise direction, detents 72 are adapted for sliding over said openings in gear 54 while the pawl 64 and gear 60 are being locked together against movement, thereby causing gears 54 and 58 also to be locked together against movement. During movement of the shaft 40 and ratchet 70 in a clockwise direction, however, detents 72 are adapted for locking engagement with said openings in gear 54 to drive said gear, gear 60 and pawl 64 at the same time operating in the manner characteristic of the ordinary escapement mechanism.

Intermediate the shaft 40 and the end wall of casing 10 which supports the plates 34 is a stationary shaft 74 which is supported between the plates 34 and about which shaft is fixedly supported an end of a spiral spring 76, said spring being coiled upon itself about the shaft 40 and having its opposite end fixedly mounted to said shaft 40. When the shaft 40 is turned in a counter-clockwise direction by such means as the hand nut 48, and the pawl 64 is caused to lock the gear 60 against movement, which locking of gear 60 simultaneously causes the locking together of gears 58 and 54 against movement, the spring 76 becomes compressed upon itself, or wound up. Then, when the operator's hand is released from nut 48, the spring 76 unwinds itself with a speed which is controlled by the escapement mechanism, the gear 60 being released from the pawl 64 and the speed of rotation of gear 60 thereafter being controlled by the oscillations of pawl 64 in the ordinary manner, gear 54 having been released from the detents 72 on the ratchet 70 when counter-clockwise movement of shaft 40 ceases and the spring 76 is allowed to unwind and driving gears 58 and 60 in accordance therewith. It should be noted that, whether the shaft 40 is turned clockwise or counter-clockwise, the sprocket wheel 42 thereon, through the chain drive 52 and the sprocket wheel 50 on shaft 28, drives said shaft 28 in accordance with said turning of shaft 40.

As is necessary in any type of escapement mechanism there must be provided some means whereby the pawl 64 is prevented from oscillating during the spring winding operation since, otherwise, the gear 60 would be free to rotate during said winding operation. Therefore, between and to the plates 34 of the spring arbor and escapement mechanism there is mounted a shaft 78 on which is pivotally supported a lever 80. The pivoted end of lever 80 is provided with oppositely directed lugs 82 and 84, lug 82 being directed toward the pawl 64 and engageable therewith for locking same against oscillation when the lever 80 is moved slightly clockwise about its pivot, and lug 84 being directed in an opposite direction from lug 82 and having secured thereto one end of a spring 86, the other end of spring 86 being anchored to one of the stationary plates 34, and spring 86 normally constraining lug 82 out of engagement with pawl 64. The free end of lever 80 extends upwardly through the casing 10 between the slots 14 and 16 therein. Intermediate the lugs 82 and 84 and the free end of lever 80 there is disposed an arm 88, one end of said arm hooking over the lever 80 and the other end of said arm being rigidly attached to the underside of a longitudinal bar 90 which is slidably mounted in the bearings of the bosses 20 and underlies the slot 14. Bar 90 is limited in movement in one direction by a rigid stop 92 and in the opposite direction by a resilient stop 94. Mounted on the bar 90 intermediate its ends is a boss 96 which has an internally threaded portion 98 extending upwardly through the slot 14 thereat and in which is disposed a set screw 100 which is adapted for locking boss 96 to bar 90 or permitting its slidability therealong, as desired. Portion 98 of boss 96 is provided with a pointer 102 which adjacently overlies the top of the casing 10 and points in a general direction toward the opening 12 therein. It will be noted that movement of bar 90 toward the right in Figs. 1 and 2 against the force of the resilient stop 94 causes the arm 88 to bring the lug 82 of lever 80 into engagement with pawl 64 to prevent oscillation of the latter. The normal position of the mechanism, however, is that shown in Fig. 2.

The means for winding the spiral spring 76 of the escapement mechanism has already been indicated at 48, the manually operated hand nut. However, the hand nut 48 can either be complemented with or replaced by a boss 104 which is formed to slide in and along the slot 16 and have its lower portion rigidly attached to one of the links of the chain drive 52. Therefore, as shown in Figs. 1 and 2, if the boss 104 is first permitted to move along the slot 16 with the chain 52 toward the right during unwinding of the spiral spring 76, it is possible to re-wind the spring thereafter by merely forcing by hand the boss 104 back into the position thereof shown in Figs. 1 and 2.

Disposed around the drums 29 is an endless shutter, generally indicated at 106, having marginal perforations engageable with the teeth 30 on said drums for being driven thereby. Shutter 106 is preferably of Celluloid material, but can be of any other suitable material which will serve the purpose thereof. Shutter 106 is composed of an opaque section 108, a translucent section 110 and a marginal opaque section 112 extending for a selected distance from section 108 along section 110.

Supported by the casing 10 slightly above the upper level of the shutter 106 is an L-shaped plate 114, the plane of plate 114 being disposed in parallelism with the upper plane of shutter 106 and defining along its longitudinal length a portion of the opening 12 and having its transverse length overlying said opening (see Fig. 1). Along said longitudinal length of said plate there is stenciled or otherwise perforated a series of equally spaced indicia, numerals being shown for the purpose of illustration, and longitudinally along said transverse length of said plate there is stenciled another series of equally spaced indicia, letters being shown for the purpose of illustration. Each letter employed is longitudinally positioned so as to be aligned with one of the numerals employed. At a distance to the left of the first numeral in the succession, which is equal to the distance between any two adjacent numerals, there is indicated on the top of the casing 10 a normal starting point for the shutter 106, such as "0," and from said "0" letters similar to the aforesaid letters are set off on the top of said casing from right to left in the same succession and with the same spacing as aforementioned.

To the shutter 106, at the break between the sections 108 and 110, there is cemented or otherwise secured an arm 116 which extends transversely of said shutter and forwardly thereof to a point at least up to the longitudinal centerline of the slot 14. This extension of arm 116 permits engagement between the said arm and the neck portion 98 of the boss 96 when the former reaches the transverse centerline of the latter during the travel of the former toward the right.

Underneath the movable shutter 106 and the numeric and lettered indicia on stationary plate 114, there is stationarily supported a test strip 118 of the printing paper that is to be used in the final enlarging process. With strip 118 so in place the casing 10 is placed in the enlarging machine, generally and diagrammatically illustrated at 120, on the easel 122 thereof, the sensitive side of said strip facing the lens 124 of the machine 120. Between the lens 124 and the usual lamp housing 126, in the latter of which is disposed the usually energized lamp (not shown), there is disposed a negative 128 from which the image thereon is to be reproduced on the test strip 118, and later on the printing paper 130 which is the source of said test strip. After the casing 10 has been so placed on the easel 122, the lamp in housing 126 is illuminated in the usual manner, the escapement mechanism in casing 10 being simultaneously set into motion, it being presumed that the test strip 118 is entirely covered by the translucent section of the shutter 106 at this time. If the arm 116 is in the position shown in Figs. 1 and 2 when the casing 10 is positioned as in Fig. 7, the test strip 118 will be exposed as shown in Fig. 6, the portion thereof at the left being under-exposed since it is that portion which is first covered by the opaque section 108 of the shutter 106, the portion at the right being over-exposed since it is that portion which is later covered by said opaque section, and the intermediate portion blending with said other portions. The position of the arm 116 in Figs. 1 and 2 is employed when the highest range of exposures is desired, such as when the factors determining the proper length of time of exposure demand it, these factors including the density of the film 128, the distance between the lens 124 and easel 122, the sensitivity of the printing paper 130, and the lamp intensity. It is clear that the skillful operator, when he has a test strip such as is shown in Fig. 6 before him, can readily select that portion thereon representative of the clearest and most detailed exposure. The test strip shown in Fig. 6 is the result of having begun the motion of the escapement mechanism after the arm 116 had been placed in the position shown in Figs. 1 and 2 and the casing 10 had been placed in the position shown in Fig. 7, the test strip therefore being wholly covered by the translucent section 110 of the shutter 106 for the length of time the escapement mechanism required for bringing the arm 116 directly over the indicium "0" provided on the top of casing 10 (as distinguished from the indicium "0" provided on the plate 114), and being thereafter covered in a gradual and progressive manner by the opaque section 108 of the shutter 106, the opaque section 112 of the shutter 106 at the same time gradually and progressively covering the lettered indicia on plate 114 while the opaque section 108 of the shutter is covering both the numbered indicia on plate 114 and the lettered indicia on the top of casing 10. The result is clearly represented in Fig. 6.

However, since normal factors which vary the time of exposure usually prevail, the arm 116 which is secured to the shutter 106 between its opaque and translucent sections 108 and 110 is placed at the indicium "0" on the top of casing 10. The casing with its test strip inserted therein in its proper position is then placed on the easel 122 and the lamp and escapement mechanism are simultaneously put into operation. The escapement mechanism gradually draws the shutter 106 across the test strip, the portion of said strip underlying the translucent section 110 of said shutter being fully exposed but gradually covered by the opaque section 108 of said shutter, and the numbered indicia on the plate 114 being at the same time gradually covered by said opaque section, the lettered indicia on both the plate 114 and the top of casing 10 having been originally covered by the act of moving the arm 116 to the normal position above described. The result is clearly indicated in Fig. 5.

With the test strip of Fig. 5 before the operator, he can readily select the position thereon which represents the final exposure desired. This position having been selected, the pointer 102 is moved thereto along the slot 14 on bar 90 and fixed thereat by means of the set screw 100. The casing 10 is then set within the vicinity of the enlarging machine, the printing paper 130 is placed in the usual manner on the easel 122, and the enlarging lamp is illuminated while, at the same time, the escapement mechanism is set in motion (the arm 116, of course, being at the indicium "0" on the top of casing 10, its normal starting position). The printing paper 130 is afforded full exposure for the length of time it takes the escapement mechanism to draw the arm 116 into contact with the pointer 102, and, when said arm and pointer engage each other, the bar 90 is automatically forced to the right, causing the arm 88 to draw the lug 82 of lever 80 into engagement with the pawl 64 and thereby stop the oscillation of said pawl and the operation of said escapement mechanism. The cessation of operation of said mechanism is the signal to extinguish the enlarging lamp, since it is then that the printing paper 130 has become exposed for the proper and novelly determined length of time.

It will be seen, therefore, that the device not only renders it possible to determine the proper time for any exposure in the enlarging process, but that it also serves as a timer during said process. It records the proper exposure on the test strip by automatically shutting off said test strip from exposure in an infinite number of progressive phases of infinitesimal duration. The speed of the shutter travel need not be uniform during the operation of exposing the test strip, since this speed, no matter what it is, need only be duplicated during the timing process. This means that the carefully described escapement mechanism, which furnishes the motive power for driving the shutter, has been selected purely for the purpose of illustrating some means for furnishing said power, but it should be readily understood that the invention contemplates its replacement with any other suitable driving source, such as an electric motor, a vibrator, or any suitable pneumatic, hydraulic or mechanical driving force the driving motion of which during the testing operation can be duplicated during the timing operation.

The test strip has been described as being stationarily held and the shutter has been described as being drawn longitudinally over the test strip. However, it is to be understood that the scope of the invention includes holding the shutter stationarily and moving the test strip relatively thereto. Also, the shutter may be of any material having a section which permits free passage of light therethrough and another section which prevents such free passage. The shutter and test strip may be moved relatively to each other in any direction other than longitudinally, such as rotatably, by replacing the shutter shown with a disc-shaped shutter having a hole therein through which light may pass to expose the test strip thereunder, without departing from the spirit of the invention. It is to be readily understood also that audible or visible indicating means can be provided for indicating the exact time the arm 116 and pointer 102 come into contact, there being no electrical sources or connections shown for and between the elements but it being contemplated that the ordinary electrician or mechanic is capable of furnishing same and that same will be so furnished. It is also contemplated that the invention can readily be made adaptable for checking the gamma of the developing solution or developer in the development of motion picture positives and negatives. Also, the invention can be made readily adaptable for use in engraving and other of such fields of endeavor.

Although the invention has been described with some detail it is not intended that such description be definitive of the limits of the inventive idea. The right is reserved to make such changes in the details of construction and arrangement of parts as will come within the purview of the attached claim.

What I claim is:

In a device of the character described, a casing in which a section of sensitized printing paper is removably supported, an aperture formed in a wall of said casing over the paper, a shutter supported within said casing, means confined within said casing and operatively connected to said shutter for selectively moving the latter in one direction across said aperture above the paper, means accessible externally of said casing and operatively connected to said shutter to enable the latter to be moved in the opposite direction, a stop member carried by said shutter for movement therewith and having a portion extending laterally therefrom externally of said casing, a support carried within said casing, a contact member for said laterally extending portion and carried in the path of travel thereof by said support externally of said casing, and means operatively interconnecting said support and said contact member for retaining the latter in any one of a plurality of selective positions on said support.

MAURICE L. ASH, Jr.